United States Patent [19]

Berger, III et al.

[11] Patent Number: 5,307,761

[45] Date of Patent: May 3, 1994

[54] VENTED LITTER BOX FOR CATS

[76] Inventors: Edwin A. Berger, III, 199-14th St. NE Suite 2610, Atlanta, Ga. 30309; George Spector, 233 Broadway Rm 702, New York, N.Y. 10279

[21] Appl. No.: 69,212

[22] Filed: Jun. 1, 1993

[51] Int. Cl.[5] .................................................. A01K 29/00
[52] U.S. Cl. ............................................................ 119/165
[58] Field of Search ................. 119/161, 162, 163, 164, 119/165, 15, 17, 19, 158, 161

[56] References Cited

U.S. PATENT DOCUMENTS

| | | | |
|---|---|---|---|
| 2,932,279 | 4/1960 | Giles | 119/19 |
| 4,095,559 | 6/1978 | Griffith | 119/165 |
| 4,522,150 | 6/1985 | Gershman | 119/165 |
| 4,559,903 | 12/1985 | Bloom et al. | 119/19 |
| 5,134,972 | 8/1992 | Compagnucci | 119/165 |
| 5,140,948 | 8/1992 | Roberts | 119/165 |

*Primary Examiner*—Thomas Price

[57] ABSTRACT

A vented litter box for a cat is provided which consists of an electric fan with an elongate flexible hose connected over an exhaust filter on a removable cover on an open top container with litter. The fan will exhaust odorous air therein to a remote location away from the litter in the container.

2 Claims, 1 Drawing Sheet

VENTED LITTER BOX FOR CATS

BACKGROUND OF THE INVENTION

The instant invention relates generally to litter boxes and more specifically it relates to a vented litter box for a cat, which provides an exhaust system to remove litter odors to a remote location.

There are available various conventional litter boxes which do not provide the novel improvements of the invention herein disclosed.

SUMMARY OF THE INVENTION

A primary object of the present invention is to provide a vented litter box for a cat that will overcome the shortcomings of the prior art devices.

Another object is to provide a vented litter box for a cat that will exhaust litter odors to a remote location away from the litter box to prevent the litter odors from emanating throughout the house.

An additional object is to provide a vented litter box for a cat in which a movable, perforated platform will turn off an exhaust fan when the cat steps onto the platform.

A further object is to provide a vented litter box for a cat that is simple and easy to use.

A still further object is to provide a vented litter box for a cat that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
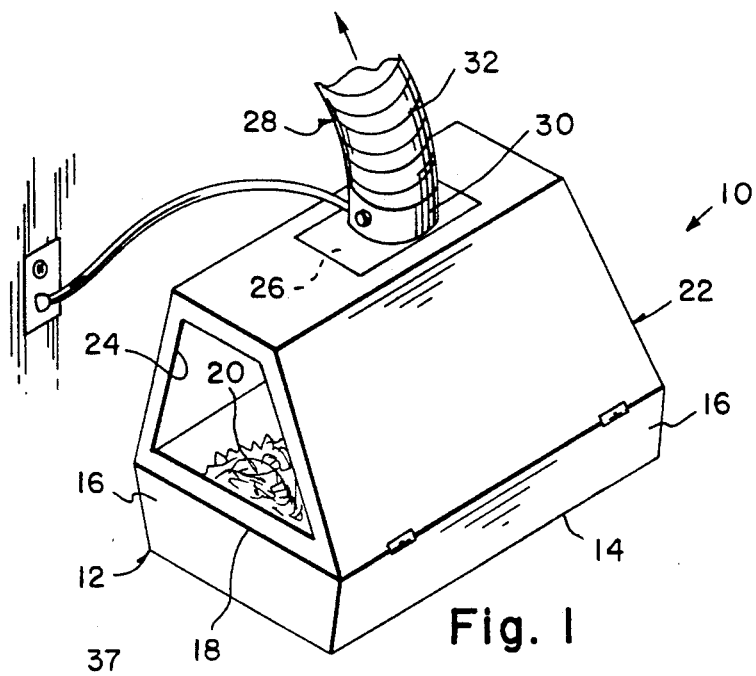
FIG. 1 is a perspective view of a litter box with an exhaust fan connected to the cover of the litter box.

Turning now descriptively to the drawings, in which similar reference characters denote similar elements throughout the several views, FIG. 1 illustrates a vented litter box 10 for a cat, which comprises an open top container 12 having a bottom wall 14 and upwardly extending side walls 16 terminating at a top edge 18 for holding litter 20 therein. A removable cover 22 having an entrance port 24 and an exhaust filter 26 is provided. The cover 22 is adapted to fit onto the top edge 18 and extends over the container 12. The entrance port 24 will allow access by the cat to the litter 20. An apparatus 28 is connected over the exhaust filter 26 for exhausting odorous air from the cover 22 and thereby drawing the odorous air through the container 12 from the litter 20 therein.

The air exhausting apparatus 28 includes an exhaust fan 30 coupled to the exhaust filter 26. An elongate flexible hose 32 extends from the exhaust fan 30 to a remote location to carry the odorous air away from the litter 20 in the container 12.

Figure 2:
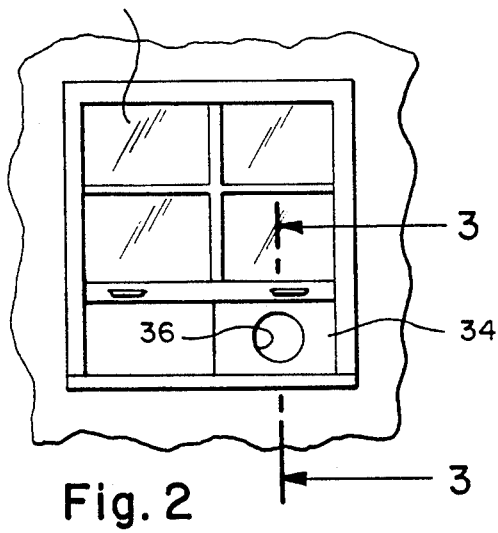
FIG. 2 is a front view of a window with an adjustable vent plate connected therein.
Figure 3:
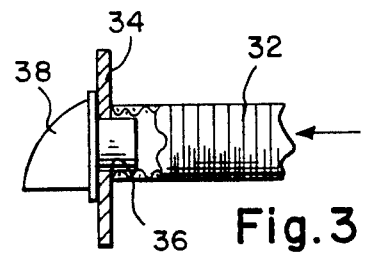
FIG. 3 is a cross sectional view taken along line 3—3 in FIG. 2, showing the vent unit mounted therein.

FIGS. 2 and 3 show an vent plate 34 having an aperture 36 therethrough. The plate 34 is mounted within a window frame 37. A vent unit 38 extends through the aperture 36 and is connected to a distal end of the elongate flexible hose 32, so that the odorous air can be exhausted therethrough.

Figure 4:
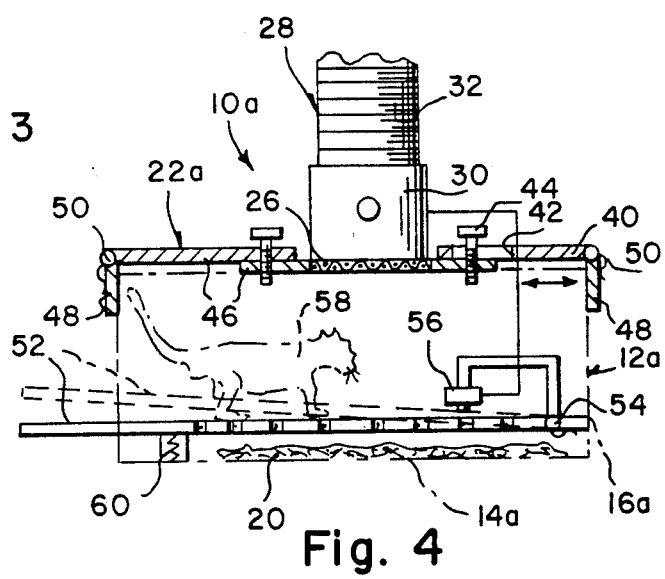
FIG. 4 is a diagrammatic view partly in cross section of a modification of the vented litter box for a cat, in which a movable platform will turn off the exhaust fan when the cats steps on the platform.

A modified vented litter box 10a is shown in FIG. 4. The removable cover 22a includes an adjustable section 40, having a slot 42 therethrough. A set screw 44 extends through the slot 42 and into a stationary section 46 of the removable cover 22a, so as to retain the adjustable section 40 thereto from moving. Side flanges 48 are spring biased and hinged at 50 to the adjustable section 40 and the stationary section 46, so as to hold the removable cover 22a to the container 12a.

A movable perforated platform 52 is spring biased and hinged at a first edge 54 within the container 12a to one side wall 16a above the litter 20. A normally closed switch 56 is electrically connected to the exhaust fan 30 and in contact with the platform 32. The switch 56 will open when the cat 58 steps onto the platform 52 to turn the exhaust fan 30 off. A compression spring 60 is mounted within the container 12a between the bottom wall 14a and the platform 52 opposite from the edge 54. The spring 60 makes sure the platform 52 returns to its original position after the cat 58 steps off the platform 52, allowing the switch 56 to turn the exhaust fan 30 back on.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A vented litter box for a cat which comprises;
   a) an open top container having a bottom wall and upwardly extending side walls terminating at a top edge for holding litter therein;
   b) a removable cover having an entrance port and an exhaust filter, said cover adapted to fit onto said top edge and extends over said container, so that said entrance port will allow access by said cat to said litter;
   c) means connected over said exhaust filter for exhausting odorous air from said cover and thereby drawing the odorous air through said container from said litter therein; wherein said air exhausting means includes:
   d) an exhaust fan coupled to said exhaust filter;
   e) an elongated flexible hose extending from said exhaust fan to a remote location to carry the odorous air away from said litter in said container;
   f) a vent plate having an aperture therethrough, said plate mounted within a window frame;
   g) a vent unit extending through said aperture and connected to a distal end of said elongated flexible hose so that the odorous air can be exhausted therethrough; wherein said removable cover includes:
   h) an adjustable section having a slot therethrough;

i) a set screw extending through said slot and into a stationary section of said removable cover, so as to retain said adjustable section thereto from moving; and j) side flanges spring biased and hinged to said adjustable section and said stationary section, so as to hold said removable cover to said container.

2. A vented litter box as recited in claim 1, further including:

a) a movable perforated platform spring biased and hinged at an edge within said container to one said side wall above said litter;

b) a normally closed switch electrically connected to said exhaust fan and in contact with said platform, whereby said switch will open when the cat steps onto said platform to turn said exhaust fan off; and c) a compression spring mounted within said container between said bottom wall and said platform opposite from said edge, so as to make sure said platform returns to its original position after the cat steps off said platform, allowing said switch to turn said exhaust fan back on.

* * * * *